United States Patent
Buchner et al.

(10) Patent No.: US 10,384,258 B2
(45) Date of Patent: Aug. 20, 2019

(54) METHOD AND DEVICE FOR CONSTRUCTION OF A WORKPIECE-RELATED WORKPIECE GRIPPING DEVICE FOR PRESS AUTOMATION

(71) Applicant: Bayerische Motoren Werke Aktiengesellschaft, Munich (DE)

(72) Inventors: Franz Buchner, Kronwieden (DE); Franz Heilmeier, Aham (DE); Siegfried Huber, Eichendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 27 days.

(21) Appl. No.: 15/175,209

(22) Filed: Jun. 7, 2016

(65) Prior Publication Data
US 2016/0288194 A1 Oct. 6, 2016

Related U.S. Application Data

(63) Continuation of application No. PCT/EP2015/053819, filed on Feb. 24, 2015.

(30) Foreign Application Priority Data

Mar. 10, 2014 (DE) .................... 10 2014 204 366

(51) Int. Cl.
*B25J 15/00* (2006.01)
*B21D 43/05* (2006.01)
*B25J 19/00* (2006.01)

(52) U.S. Cl.
CPC ............ *B21D 43/057* (2013.01); *B25J 15/00* (2013.01); *B25J 15/0061* (2013.01); *B25J 19/007* (2013.01)

(58) Field of Classification Search
CPC ... B21D 43/057; B25J 19/007; B25J 15/0061; Y10T 29/53991
See application file for complete search history.

(56) References Cited

U.S. PATENT DOCUMENTS 5,815,912 A * 10/1998 Willshere ................. B23K 3/08
29/721
5,870,820 A * 2/1999 Arakawa ............ H05K 13/0486
29/740

(Continued)

FOREIGN PATENT DOCUMENTS

CN 203887859 U 10/2014
DE 195 15 994 A1 11/1996

(Continued)

OTHER PUBLICATIONS

Chinese-language Office Action issued in counterpart Chinese Application No. 201580002781.0 dated Jan. 4, 2017 with English translation (Fifteen (15) pages).

(Continued)

*Primary Examiner* — Rick K Chang
(74) *Attorney, Agent, or Firm* — Crowell & Moring LLP

(57) ABSTRACT

A method and a device are provided for construction of a workpiece-related workpiece gripping device for press automation, the workpiece-related workpiece gripping device having workpiece-specific components fastened to a support. The respective precise positions and orientations of the workpiece-specific components to be fastened to the support are reproduced by a motion automaton, in particular a robot.

5 Claims, 1 Drawing Sheet

(56) References Cited

U.S. PATENT DOCUMENTS

| | | | |
|---|---|---|---|
| 5,974,643 A * | 11/1999 | Hays | B23Q 17/2233 29/39 |
| 7,267,383 B2 | 9/2007 | Bilsing | |
| 7,636,612 B2 | 12/2009 | Weber et al. | |
| 7,784,324 B2 | 8/2010 | Dangelmayr | |
| 2014/0056670 A1 | 2/2014 | Gebhard | |
| 2015/0020365 A1 | 1/2015 | Valasek et al. | |
| 2015/0174637 A1 | 6/2015 | Lee | |

FOREIGN PATENT DOCUMENTS

| | | |
|---|---|---|
| DE | 197 51 502 A1 | 6/1999 |
| DE | 100 64 947 A1 | 7/2002 |
| DE | 101 23 661 A1 | 12/2002 |
| DE | 10 2005 024 822 A1 | 11/2006 |
| DE | 10 2010 035 983 B3 | 10/2011 |
| DE | 10 2010 053 401 A1 | 6/2012 |
| DE | 10 2011 001 924 B4 | 9/2013 |
| EP | 1 862 237 A1 | 12/2007 |
| EP | 1 600 226 B1 | 4/2008 |
| EP | 2 377 630 A1 | 10/2011 |
| JP | 2010-158739 A | 7/2010 |
| WO | WO 2012/163390 A1 | 12/2012 |
| WO | WO 2013/120462 A2 | 8/2013 |
| WO | WO 2014/014172 A1 | 1/2014 |

OTHER PUBLICATIONS

Chinese-language Office Action issued in counterpart Chinese Application No. 201580002781.0 dated Sep. 28, 2017 with English translation (Twelve (12) pages).

Chinese-language Office Action issued in counterpart Chinese Application No. 201580002781.0 dated Apr. 19, 2018 with partial English translation (11 pages).

International Search Report (PCT/ISA/210) issued in PCT Application No. PCT/EP2015/053819 dated May 4, 2015 with English translation (Four (4) pages).

German-language Written Opinion (PCT/ISA/237) issued in PCT Application No. PCT/EP2015/053819 dated May 4, 2015 (Four (4) pages).

German-language Search Report issued in counterpart German Application No. 10 2014 204 366.2 dated Oct. 9, 2014 with partial English translation (Twelve (12) pages).

* cited by examiner

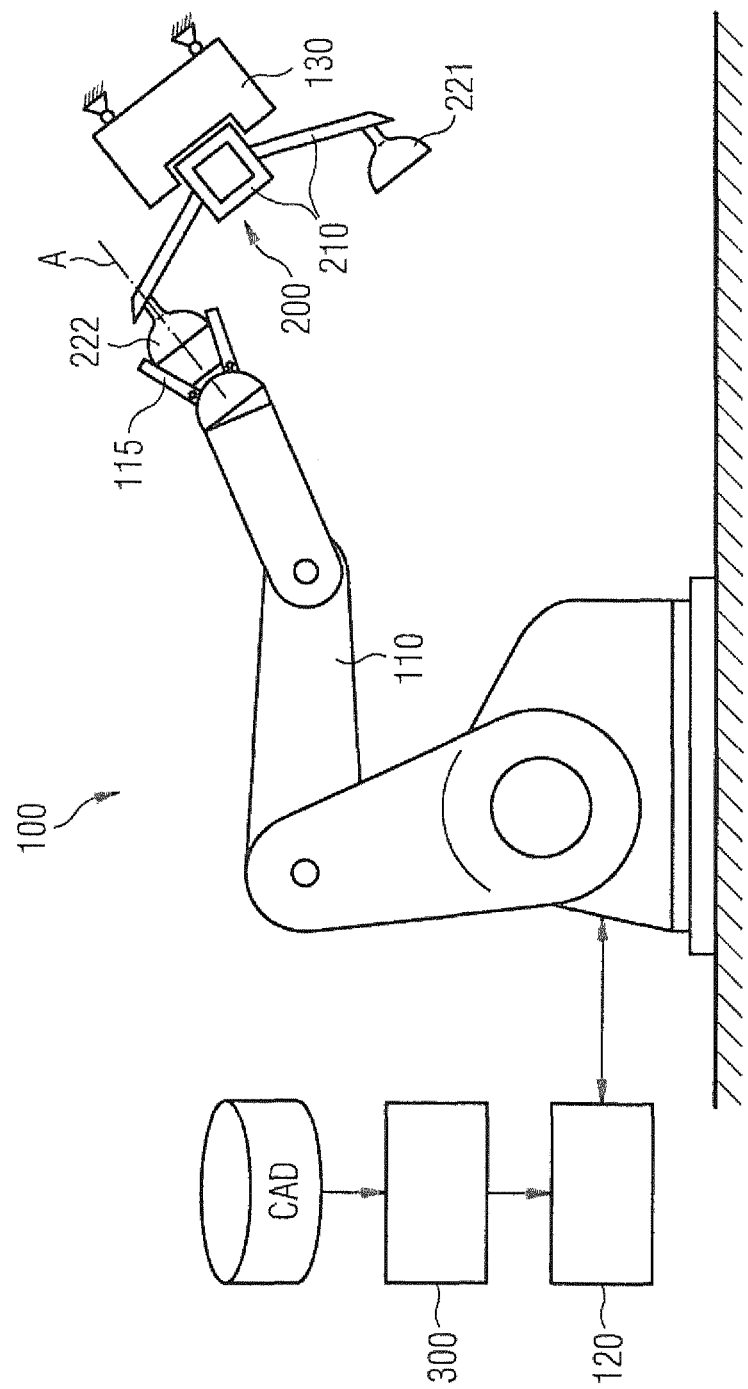

METHOD AND DEVICE FOR CONSTRUCTION OF A WORKPIECE-RELATED WORKPIECE GRIPPING DEVICE FOR PRESS AUTOMATION

CROSS REFERENCE TO RELATED APPLICATIONS

This application is a continuation of PCT International Application No. PCT/EP2015/053819, filed Feb. 24, 2015, which claims priority under 35 U.S.C. § 119 from German Patent Application No. 10 2014 204 366.2, filed Mar. 10, 2014, the entire disclosures of which are herein expressly incorporated by reference.

BACKGROUND AND SUMMARY OF THE INVENTION

The invention relates to a method and a device for the construction of a workpiece gripping device for press automation.

Workpiece gripping devices for press automation are known from the state of the art. A workpiece gripping device of the corresponding type has a support constructed of one or more parts, on which support at least one gripping device (such as a vacuum suction device, a pneumatic clamp, a magnetic gripper or the like) is arranged. The support may also be a frame structure formed of several support tubes, bars, profiled supports and the like. For carrying out a workpiece transport, at least one workpiece gripping device can be moved by means of at least one drive device (such as a robot, a feeder, a crossbar feeder or the like). Concerning the general state of the art, reference is made to German Patent Documents DE 10 2010 035 983 B3 and DE 10 2011 001 924 B4, European Patent Documents EP 1 600 226 B1, EP 1 862 237 A1 and EP 2 377 630 A1, and International Patent Document WO 2014/014172 A1.

Different suggestions for simplifying the construction of a workpiece gripping device are known from the state of the art. German Patent Document DE 100 64 974 A1 describes a device for the simplified connection of support tubes and a modular gripper system using this device. German Patent Document DE 101 23 661 A1 describes a component gripper in a modular construction. German Patent Document DE 197 51 502 A1 also describes a modular unit as well as a gripping and transport handling device constructed of standardized tube elements and plug connections, and a method for constructing and adjusting the latter.

A more extensive approach is described in the closest German Patent Document DE 10 2010 053 401 A1. In order to simplify the integration of a pressing system mechanization for the manipulating of sheet metal workpieces (molded blanks) into a pressing system and to reduce the integration time, it is suggested to build up the mechanization corresponding to construction data away from the pressing system and to check the movement path by motion simulation for the setting and/or adjusting as well as for the optimization.

The invention has the purpose of indicating possibilities as to how the construction and the startup of a workpiece gripping device of the corresponding type can be further simplified.

This is achieved by the method according to the invention for the construction of a workpiece-related workpiece gripping device with workpiece-specific components being fastened to a support, in which the method provides that the exact positions and orientations of the workpiece-specific components to be fastened to the support are indicated by an automatic handling device. The indicating of the exact positions and orientations takes place automatically, which means that the automatic handling device does not have to be moved or controlled manually, but the corresponding position and orientation for a component to be fastened to the support is indicated by automatic driving and adjusting motions of the automatic handling device.

A workpiece gripping device to be constructed is used particularly for the insertion or removal of sheet metal workpieces or sheet- or shell-type workpieces (for example, workpieces made of plastic or plastic composite, such as CFC or GFRP) at a press station or the like or within a press working line. In a self-explanatory fashion, a corresponding workpiece gripping device is specifically or individually adapted to the workpiece to be gripped (or as required, to several workpieces to be gripped), which, within the scope of the invention, is called a workpiece-related workpiece gripping device. Workpiece-specific or workpiece-individual components, in particular, are gripping devices which, in their attitude (position and orientation), are adapted to the geometry of the workpiece to be gripped (such as a vacuum suction device, a pneumatic clamp, a magnetic gripper, blades or the like) and sensors.

At least with respect to the display of positions and orientations for the workpiece-specific components to be fastened, the process according to the invention takes place automatically (as explained above), the actual fastening of the workpiece-specific components to the support of the workpiece gripping device to be constructed, typically takes place manually by personnel. The fastening can be followed by further working steps, such as the construction of an electric wiring and/or a pneumatic or vacuum piping.

The indicating or specifying of the exact positions and orientations of the workpiece-specific components to be fastened to the support, according to the invention, takes place by at least one automatic handling device or, as required, several automatic handling devices. In particular, this automatic handling device is an articulated-arm industrial robot (multi-arm joint robot or multi-axis robot), to whose robot arm, for example, a suitable pointer device is linked (which may have, for example, a rod-shaped or plate-plate or other suitable design). An automatic handling device may also, for example be a portal system (Cartesian Portal System).

The support to which the workpiece-specific components are to be fastened may be constructed of one or of several parts. As initially explained, the support may be a frame structure formed of several support tubes, bars, profiled supports and/or the like. A conceivable approach for the construction of a workpiece-gripping device provides that the support, which as required is prefabricated or preassembled according to construction specifications, is held in a defined spatial and orientation, while, by the automatic handling device indicates, the positions and orientations of the workpiece-specific components which are to be fastened thereto. For this purpose, the control of the automatic handling device knows the spatial position and the orientation of the support. Another conceivable approach for the construction provides that the support is constructed according to construction specifications corresponding to the positions and orientations indicated by the automatic handling device for the workpiece-specific components to be fastened thereto. Combinations of the two approaches are also conceivable. After one component was installed, the position of the component to be installed next can be indicated by control command, the handling device moving automatically and without any collision into the next position.

The invention permits the essentially ready-to-mount construction of a workpiece-related workpiece gripping device away from the press station or press working line in which, subsequently, the workpiece gripping device is to be used for operating at least one press. The construction can take place without a press tool that is to be operated by the workpiece gripping device to be constructed. However, most notably, the construction can also take place without the workpiece that is to be gripped by the workpiece gripping device to be constructed. The invention thereby also permits a construction (or, as required, also a retrofitting) without tools and without workpieces of a workpiece-related workpiece gripping device. The invention therefore fundamentally differs from the approach described in German Patent Document DE 10 2010 053 401 A1, which necessarily provides a workpiece (molding) and a receiving device for this workpiece. This workpiece frequently is a prototype that was produced at high expenditures and costs. The automatic handling device used within the scope of the invention is used as a quasi replacement for a workpiece, particularly a sheet metal workpiece or the like, and a receiving or depositing device is used for simulating the precise position. The automatic handling device and its control device virtually image the workpiece to be gripped.

The invention advantageously permits the construction of a workpiece-related or workpiece-specific workpiece gripping device independently of the press station or press line and independently of the press tool construction. The construction of the workpiece gripping device can be started at any time without any preconditions, which can result in an equalizing of target dates. Compared to the solutions known from the state of the art, the construction time and the integration time into the press station or press line are clearly reduced. The invention results in logistical and time-related advantages as well as considerable advantages with respect to material, place or space and costs. This also has positive effects on the press tool construction.

Using of the automatic handling device, the workpiece-specific components to be fastened to the support may preferably be moved individually into their exact position and orientation. The workpiece specific component to be installed next is therefore made available by the automatic handling device in the position to be approached next. For this purpose, a suitable holder (for example, a gripping holder, a suction holder or the like) may be linked to the automatic handling device (for example, at the robotic arm), and with using the which holder, the component to be fastened next can be picked up and held particularly such that, without any depositing or shifting, the latter can be fastened directly to the support of the workpiece gripping device to be constructed and, in the process, can particularly also be oriented and adjusted. After a component was installed, the next position can be approached by control command, in which case, it is preferably provided that the automatic handling device receives the component to be installed next and, in particular, receives it automatically (for example, from a supply) and moves it into the correct installation position and orientation.

The position data and orientation data for the workpiece-specific components to be fastened to the support of the workpiece gripping device to be constructed may be determined in an automated manner from a CAD data set for the workpiece to be gripped by the workpiece gripping device to be constructed or can be derived from these CAD data. The CAD data of the workpiece to be gripped as a rule are present anyhow and are required, for example, for the press tool construction, and/or, as required, the data for the workpiece's precise positioning and orientation in the press tool to be operated (or the like) can be utilized for controlling the automatic handling device. The arrangement of the tool-specific components with respect to the workpiece to be gripped can be preset in an automated or manual manner. The generating of the control data for the automatic handling device from the CAD data of the workpiece to be gripped, or, as required, also from the CAD data of the press tool to be operated, can take place in an automated manner by suitable software.

Preferably, an ideal succession or sequence for fastening all workpiece-specific components to the support is determined and implemented in an automated manner. An ideal succession can be obtained, for example, from a required accessibility for the automatic handling device and/or for the personnel, in which case, ergonomic aspects for the personnel can also be taken into account.

Furthermore, a position in space for the support can be determined in an automated manner that is optimized for the fastening of all workpiece-specific components to the support and, in particular, is optimal, which position in space is correspondingly taken into account during the automatically implemented movements of the automatic handling device. The optimal position in space can be obtained, for example, from a required accessibility for the automatic handling device and/or for the personnel, in which case, ergonomic aspects for the personnel can also be taken into account.

A device according to the invention for the construction of a workpiece-related workpiece gripping device for the press automation has at least one automatic handling device having a control device, wherein the automatic handling device and the control device are designed for automatically indicating the exact positions and orientations of the workpiece-specific components to be fastened to a support of the workpiece gripping device to be constructed.

The device according to the invention preferably further comprises (at least) one holding device by which the support of the workpiece gripping device to be constructed can be held in a position and location in space defined with respect to the automatic handling device, particularly in an optimized position in space.

The device according to the invention preferably also comprises a computer device, by which, in an automated manner, control data for the automatic handling device can be generated from the CAD data of the workpiece to be gripped by the workpiece gripping device (or, as required several workpieces to be gripped) and/or possibly from the CAD data of at least one press tool to be operated. In particular, this takes place by suitable software. The control data generated in an automated manner by the computer device are forwarded to the control device of the automatic handling device (or read in by the control device), the control commands are generated therefrom, and a corresponding controlling of the automatic handling device is carried out.

The device according to the invention can be used for the construction of different workpiece-related workpiece gripping devices.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic view of a device according to and embodiment of the invention for implementing the method according to an embodiment of the invention.

DETAILED DESCRIPTION OF THE DRAWING

The device 100 illustrated in FIG. 1 for the construction of a workpiece-related workpiece gripping device 200 for the press automation comprises an automatic handling device in the form of an articulated-arm industrial robot 110 and a changeable or adjustable holding or gripping device 130, by which the support 210 of the workpiece gripping device 200 to be constructed can be held in a location and position in space defined with respect to the robot 110. The position in space taken up by the support 210 is an optimized position in space, as explained above.

Using the robot 110, the workpiece-specific components to be fastened to the support 210 are individually moved into their exact position and orientation and can then be manually fastened to the support 210 by an employee. These workpiece-specific components are, for example, vacuum suction devices (vacuum grippers), pneumatic clamps, magnetic grippers, bucket lifts, fork lifts (undergripping lifts), sensors (for example, for detecting the receiving of a workpiece) and/or the like.

The workpiece-specific components are fastened individually in an ideal succession determined beforehand to the multipart support 210. In the illustrated example, after the lower vacuum suction device 221 was fastened to the support 210 in the precise position and orientation, the robot 110 will move to the next position upon the pressing of a button and, along the way, will pick up the vacuum suction device 222 to be installed next (or another component to be installed next) and will automatically move the latter into the correct installation position and location (as illustrated). For this purpose, a holder 115 is arranged on the robotic arm of the robot 110. The holder 115 permits a direct fastening of the held component 222 to the support 210 without any depositing or shifting. The orientation of the component 222 to be fastened is illustrated by the dash-dotted line A. Analogously, additional workpiece-specific components can be fastened to the support 210 in an exact position and orientation.

As an alternative to the preceding approach, it may be provided that, using the robot 110, only the exact positions and orientations of the workpiece-specific components to be fastened to the support are indicated, the respective component then being manually mounted and aligned. In this case, the robot 110 operates as a quasi template.

The workpiece to be gripped by the illustrated workpiece gripping device 200 to be constructed, in particular, is a sheet metal workpiece or a sheet-metal-type workpiece, as explained above.

Using the computer device 300, control data for the robot 110 can be generated in an automated manner from the CAD data of the workpiece to be gripped by the workpiece gripping device 200 to be constructed (or as required several workpieces to be gripped). As an alternative or in addition, CAD data of a press tool can also be used which is to be operated by the workpiece gripping device 200 to be constructed. This takes place particularly by suitable software. The control data generated by the computer device 300 in an automated manner are forwarded to the control device 120 of the robot 110, which generates control commands therefrom and carries out a corresponding controlling of the robot 110.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

Method and Device for Construction of a Workpiece-Related Workpiece Gripping Device for Press Automation
- 100 Device
- 110 Robot (Automatic Handling Device)
- 115 Holder (Sensor)
- 120 Control Device
- 130 Holding Device
- 200 Workpiece Gripping Device
- 210 Support
- 221 Workpiece-Specific Component (Vacuum Suction Device)
- 222 Workpiece-Specific Component (Vacuum Suction Device)
- 300 Computer Device
- A Orientation
- CAD CAD Data FIG. 1

What is claimed is:

1. A method for construction of a workpiece-related workpiece gripping device for press automation, comprising the acts of:
   locating a support of the workpiece-related workpiece gripping device at a predefined location in a predefined orientation relative to an automatic handling device;
   obtaining, using a control device, data identifying positions and orientations of respective ones of a plurality of workpiece-specific components to be installed on the support during construction of the workpiece-related workpiece gripping device; and
   controlling, using the control device, the automatic handling device separate from the support to construct the workpiece-related workpiece gripping device by positioning, orienting and installing the respective ones of plurality of workpiece-specific components on the support in respective positions and orientations identified in the position and orientation data of the respective ones of the plurality of workpiece-specific components obtained in the obtaining act.

2. The method according to claim 1, wherein
   in the controlling act, the automatic handling device is controlled by the control device to move each of the plurality of workpiece-specific components individually into the respective positions and orientations of the respective ones of the plurality of workpiece-specific components on the support.

3. The method according to claim 1, wherein
   the positions and orientations data for the workpiece-specific components are obtained by the control device in an automated manner from a CAD data set for a workpiece to be gripped by the workpiece gripping device.

4. The method according to claim 3, further comprising the act of:

determining using the control device an order of installation of each of the plurality of workpiece-specific components on the support in an automated manner, wherein the order of installation is implemented by the control device in the automatic handling device controlling act.

5. The method according to claim 4, further comprising the acts of:

determining using the control device a position in space of the support which takes into account movements of the automatic handling device during the positioning, orienting and installing of the plurality of workpiece-specific components on the support in the automatic handling device controlling act; and positioning, in an automated manner controlled by the control device, the support in the determined position in space.

* * * * *